United States Patent
Cohen et al.

[11] Patent Number: 6,014,151
[45] Date of Patent: Jan. 11, 2000

[54] METHOD FOR ALLOWING A PARTICLE TO FOLLOW A PATH

[75] Inventors: Eyal Cohen, Los Altos; Olivier Maury; Eric Tabellion, both of San Francisco, all of Calif.

[73] Assignee: Animation Science, Sunnyvale, Calif.

[21] Appl. No.: 08/964,748

[22] Filed: Nov. 5, 1997

[51] Int. Cl.[7] ................................................. G06T 15/70
[52] U.S. Cl. ................................................................. 345/474
[58] Field of Search ..................................... 345/419, 420, 345/473, 474, 475

[56] References Cited

U.S. PATENT DOCUMENTS

| | | | |
|---|---|---|---|
| 5,404,426 | 4/1995 | Usami et al. | 345/420 |
| 5,777,619 | 7/1998 | Brinsmead | 345/419 |

FOREIGN PATENT DOCUMENTS 4-304574   10/1992   Japan .

OTHER PUBLICATIONS

"3D Studio Max Applied", Clayton et al., Advanstar Communications, pp. 114–120, 1996.

*Primary Examiner*—Mark K. Zimmerman

[57] ABSTRACT

A method, apparatus, and article of manufacture for allowing a particle to follow a path. A one dimensional path having an attraction force which affects particles is embodied in N-dimensional space, such as two dimensional or three dimensional space. The attraction force is then applied to the particle in the direction of the path, where the magnitude of the force corresponds to the distance between the particle and the path. The attraction force may optionally be applied for only a percentage of the path length.

9 Claims, 2 Drawing Sheets

METHOD FOR ALLOWING A PARTICLE TO FOLLOW A PATH

FIELD OF THE INVENTION

This invention relates generally to improvements in computer graphics animation, and more particularly, to a method for allowing a particle to follow a path.

BACKGROUND OF THE INVENTION

Computer animation with particle system technology addresses a growing need to simulate complex systems for predicting real world performance. A complex system is modeled as a collection of a large number of constituents called particles. Particles interact among themselves, with other particle sources, and with surrounding surfaces or obstacles. They can be subject to external natural forces such as gravity, winds, and collisions with other particles, and can also be coupled with a surrounding medium such as a fluid flow. The results can then be output as a three dimensional (3D) rendered visual to view the system simulation results.

Particle systems were first introduced in the early 1980's for the modeling and the visualization of natural fuzzy phenomena like clouds, water, gasses and fire. The principle consists of defining objects as clouds of elementary primitives, which are the particles, and assigning to each of them physical attributes that determine their temporal evolution in terms of physical laws.

Particles are created in a system by a particle source or emitter. An emitter defines each particle with such characteristics as a position in space, dimension, size and geometry, rate of emission as a function of time, and direction of emission, which is typically given by a vector, a local normal to a surface, or a given trajectory.

In order to model objects with a group of particles, it is desirable to have the group of particles conform to an underlying structure or path. The particles are defined to interact with the path and each other such that a large object may be modeled over time. By defining a 3D path an object may be formed having the underlying structure of the path when the emitted particles are constrained along the direction of the path.

One well-known way of constraining a particle along a path is through the use of metaballs. A metaball is a density-based, isopotential surface, which is a field of matter that comprises a solid core with a visible surface and a semi-solid area of influence that decreases by the distance. When areas of influence of two or more metaballs overlap, their densities fuse together forming a new and more complex surface. Metaballs are ideally suited to modeling of smooth organic forms such as the human body. The surface of a metaball defines a boundary along the path which the object particles must not cross. In other words, a particle created by an emitter has its direction and velocity constrained by the boundary created by the metaballs along the path of the intended object.

Because metaballs define a boundary across which particles may not cross, it may be difficult to use them to model naturally fuzzy objects with no easily discernible boundaries, such as fire. Therefore, there is a need for a way to allow a particle to follow a path which does not constrain the particle by the use of boundaries.

SUMMARY OF THE INVENTION

The present invention provides a method, apparatus, and article of manufacture for allowing a particle to follow a path. A one dimensional path having an attraction force which affects particles is embodied in N-dimensional space, such as two dimensional or three dimensional space. The attraction force is then applied to the particle in the direction of the path, where the magnitude of the force corresponds to the distance between the particle and the path. The attraction force may optionally be applied for only a percentage of the path length.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

The present invention provides a method for allowing a particle to follow a path. A one dimensional path having an attraction force which affects particles is embodied in N-dimensional space, such as two dimensional or three dimensional space. The present invention applies the attraction force to particles in the direction of the path, where the magnitude of the force corresponds to the distance between the particle and the path. The present invention optionally allows the attraction force to be applied for only a percentage of the path length as defined by a path percentage.

Hardware Environment

Figure 1:
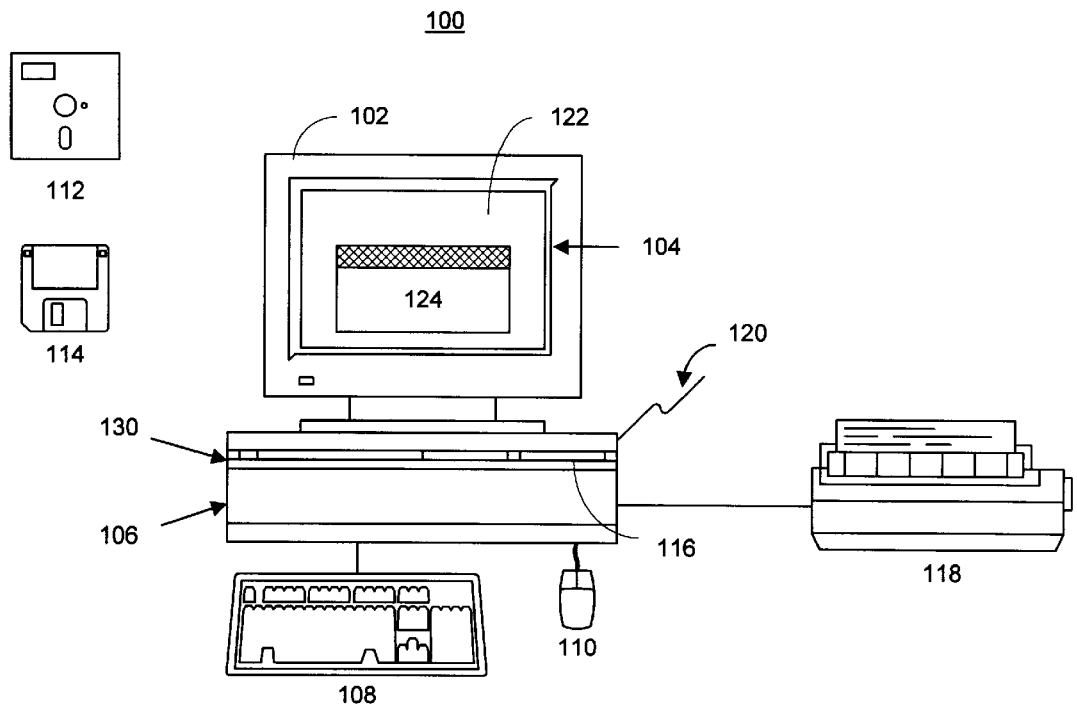
FIG. 1 is a system diagram which shows a computer hardware environment compatible with the present invention.

FIG. 1 shows a computer hardware environment that could be used with the present invention. The present invention is typically implemented using a computer 100, wherein the computer 100 comprises a processor 106, random access memory (RAM) 130, and read-only memory (ROM) and/or other components. The computer 100 may be coupled to I/O devices, such as a monitor 102, keyboard 108, mouse device 110, fixed and/or removable data storage devices 112 and 114, and printer 118. The computer 100 could also be coupled to other I/O devices, including a local area network (LAN) or wide area network (WAN) via interface cable 120. Those of ordinary skill in the art will recognize that any combination of the above components, or any number of different components, peripherals, and other devices, may be used with the computer 100.

Generally, the computer 100 operates under control of an operating system 122, which is represented by the display 104 on the monitor 102. The present invention is preferably implemented using one or more computer programs or applications 124, which are represented by the window displayed on the monitor 102 operating under the control of the operating system 122. The operating system 122 and computer program 124 are loaded from a data storage devices 112 and/or 114 into the memory 130 of the computer 100 for use during actual operations.

In the preferred embodiment of the present invention, the operating system 122 and the computer program 124 are useably embodied in a computer-readable medium, e.g., data storage devices 112 and/or 114 which could include one or more fixed or removable data storage devices, such as a floppy disk drive, hard drive, CD-ROM drive, tape drive, etc. Further, the operating system 122 and the computer program 124 are comprised of instructions which, when read and executed by the computer 100, causes the computer 100 to perform the steps necessary to implement and/or use the present invention. Those of ordinary skill in the art will recognize that many modifications may be made to this configuration, including the number, size, and types of components, without departing from the scope of the present invention.

A method and apparatus for allowing a particle to follow a path are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

Particle Definition

Figure 2:
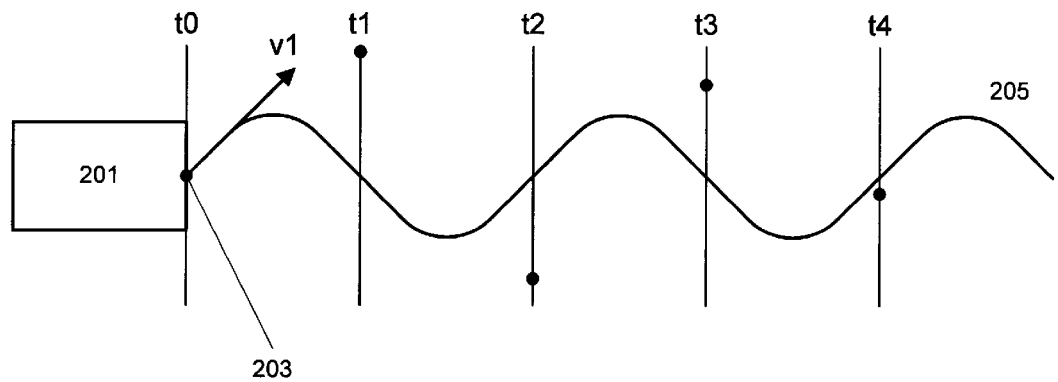
FIG. 2 is an illustration of path following compatible with the present invention.

The present invention allows a user to create and subsequently define and characterize a particle 203 that can be emitted by a particle emitter 201 in a computer animation, as shown in FIG. 2. A representative list of the different types of parameters which are compatible with the present invention are discussed below. It will be recognized that other particle parameters may be used with the present invention without loss of generality.

1. Lifetime. Lifetime determines the amount of time, in frames, the particle will exist. At the end of this time, the particle will decay or die. If a decay event has been created, the particle can spawn new particles at the end of its lifetime. Lifetime may also be specified as a range.

2. Trail life. Trail life determines the amount of time, in frames, that a trial effect will remain behind the particle as it travels in space.

3. Size. Size represents the size of the particles in a standardized unit of measurement. In an embodiment of the present invention, 3D Studio Max units are used, but it will be recognized that other units of measurement may be used without loss of generality.

4. Mass. Mass controls the behavior of particles in collisions. Mass also affects how other parameters influence the particle. Mass is used to provide resistance to forces such as gravity, wind, magnetic, and electric forces.

5. Drag. Drag controls the effect of drag, or friction, on the particle. This is helpful when simulating a particle traveling through a medium such as water or air. Drag is affected by a wind global force, if such a force is set.

6. Electric. Electric sets the amount of influence an electric field in the scene will have on the particle. Electric fields set up attract or repel situations.

7. Magnetic. Magnetic sets the amount of influence a magnetic field in the scene will have on the particle. Magnetic fields set up a circular force similar to a vortex.

8. Collision rate. Collision rate determines the internal collision rate between particles of the same type. The higher the rate, the more accurate collision calculations become and consequently, the longer it will take to calculate.

9. Noise. Noise allows a random element to be added to a particle's position, velocity, or acceleration.

10. Velocity. Velocity noise applies a random factor to a particle's speed direction.

The same position and velocity noise values are typically applied to each particle instance of a given particle type. However, it will be recognized that it is possible to create expressions that are able to bypass this limitation without loss of generality with the present invention.

The present invention enables a user to define a particle path 205, as shown in FIG. 2. A one dimensional path may be embodied in N dimensions and may have an arbitrary geometry. In an embodiment of the present invention, splines are used to define the path, but it will be recognized that any method of defining a path through space, such as a linear curve, cardinal curve, Bezier curve, B-splines, or non-uniform rational B-splines may be used with the present invention.

Once a path has been created, the present invention enables a user to assign parameters to the path. These parameters control the force that affect particles within the area of influence of the path. A representative list of the different types of path parameters which are compatible with the present invention are discussed below. It will be recognized that other path parameters may be readily used with the present invention.

1. Follow. Follow causes particles to flow along the precise shape of the path.

2. Attracted. Attracted causes the path to influence particle travel, but other forces are free to act on the particle as well.

3. Strength. Path strength allows control over how precisely particles are translated or attracted along the profile of the selected path. The higher the value, the more precisely particles will follow the path or the more they will be attracted to the path. The strength value may be given by a function.

4. Limit. When using a path to attract particles, the further a particle is from the path, the more force is applied to it to bring it back to the path. Limit sets the maximum value for this force. Lowering the limit may reduce oscillation of particles around the path.

5. Time start. Start defines the first frame of the path that affects the movement of the particles.

6. Time end. End defines the last frame of an animation that the path affects the movement of the particles.

7. Path percentage length. Path percentage length defines the distance along the path from the first vertex which is used to attract particles. The value for the path percentage length may be greater than 100%. When the path percentage length is greater than 100%, multiple trips along the path are performed.

8. Decay inheritance. When decay inheritance is selected, all new particles that may be created as a result of a decay event will be influenced by the selected path.

As shown in FIG. 2, a particle 203 has an initial speed and direction described by a vector v1 when it leaves the emitter 201 at time t0. In this example, path 205 is set to attract the particle 203 with a strong amount of force. Over time t1 through t4, the path 205 attracts particle 203 so that the trajectory of particle 203 becomes roughly equal to that of the path 205. If the path attraction force is moderate, the trajectory of particle 203 and path 205 may not match, but instead, particle 203 will oscillate about the path 205.

In order to determine which point on the path 205 the particle 203 is attracted to, the path 205 is preferably sampled according to the following parameters:

ts time start te time end p path percentage

Let f(u) be a vector function which returns a point in space belonging to the path 205 sampled according to a parameter t between 0 and 1. A preferred sampling strategy is a mapping function of time towards a u domain. At time t, where ts<t<te, the particle 203 will preferably be attracted to or be following a point on the path 205 defined by $$u=(t-ts)/(te-ts)*p/100$$

if the particle 203 is born before ts, or a point on the path 205 defined by $$u=(t-tb)/(te-ts)*p/100$$

if the particle is born at a time tb where ts<tb<te.

Figure 3:
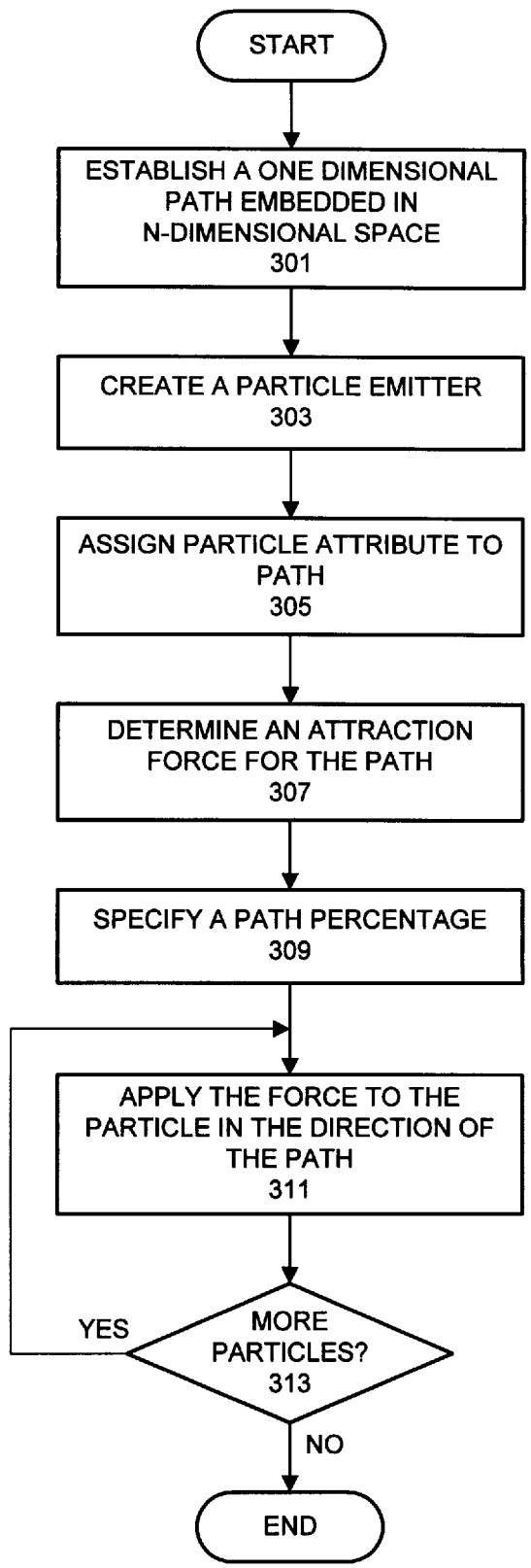
FIG. 3 is a flowchart which shows a method for allowing a particle to follow a path compatible with the present invention.

FIG. 3 describes the preferred steps of the present invention for allowing a particle to follow a path. At 301, a path is embedded in a N-dimensional space, where N is greater than or equal to one. The path may be of a dimension less than N, but is typically greater than or equal to one. Thus, it is possible, for example, to have a two dimensional path embedded in a three dimensional space. At 303, a particle emitter is created and placed in space such that emitted particles will interact with the path. At 305, particle attributes are assigned to the path to control how particles are attracted by the path. At 307, an attraction force for the path is determined. 309, a path percentage length is optionally defined which indicates which portion of the path will attract particles. At 311, the attraction force defined at step 307 is applied to a particle in the direction of the path.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method of allowing a particle to follow a path, comprising the steps of:

establishing a path having an attraction force;

exposing a particle to the attraction force;

establishing a path percentage length for the path; and exposing the particle to the attraction force for the path percentage length.

2. The method of claim 1 further comprising the step of moving the particle toward the path in accordance with the attraction force for the path percentage length.

3. The method of claim 1 wherein the step of establishing a path percentage length for the path comprises the step of defining a distance from a first vertex located at a point along the path to a second vertex located at a point which is a percentage of the total path distance away from the first vertex, wherein the path percentage may be greater than 100%.

4. An apparatus for allowing a particle to follow a path, comprising:

a digital computer having input means for allowing the entering of a path, an attraction force and a particle;

calculation means operated by the digital computer for exposing a particle to the attraction force;

distance means operated by the digital computer for establishing a path percentage length for the path; and expose means operated by the digital computer for exposing the particle to the attraction force for the path percentage length.

5. The apparatus of claim 4 further comprising means operated by the digital computer for moving the particle toward the path in accordance with the attraction force for the path percentage length.

6. The apparatus of claim 4 wherein the distance means further comprises means for defining a distance from a first vertex located at a point along the path to a second vertex located at a point which is a percentage of the total path distance away from the first vertex, wherein the path percentage may be greater than 100%.

7. An article of manufacture for use in a computer system for allowing a particle to follow a path, the computer having a keyboard pointing device, visual display and data storage device, the article of manufacture comprising a computer usable medium having computer readable program code means embodied in the medium, the program code means comprising:

computer readable program code means embodied in the computer usable medium for causing a computer to establish a path having an attraction force;

computer readable program code means embodied in the computer usable medium for causing a computer to expose a particle to the attraction force;

means embodied in the computer usable medium for causing a computer to establish a path percentage length for the path; and means embodied in the computer usable medium for causing a computer to expose the particle to the attraction force for the path percentage length.

8. The article of manufacture of claim 7 further comprising means embodied in the computer usable medium for causing a computer to move the particle toward the path in accordance with the attraction force for the path percentage length.

9. The article of manufacture of claim 7 wherein the means for causing a computer to establish a path percentage length for the path comprises means embodied in the computer usable medium for causing a computer to define a distance from a first vertex located at a point along the path to a second vertex located at a point which is a percentage of the total path distance away from the first vertex, wherein the path percentage may be greater than 100%.

* * * * *

UNITED STATES PATENT AND TRADEMARK OFFICE
CERTIFICATE OF CORRECTION

PATENT NO : 6,014,151
DATED : 1/11/2000
INVENTOR(S): Cohen, et al.

It is certified that an error appears in the above-identified patent and that said Letters Patent is hereby corrected as shown below:

In claim 7 (at column 6, line 30), replace "keyboard pointing device" with --keyboard, pointing device--.

Signed and Sealed this

Twenty-fifth Day of July, 2000

Attest:

Q. TODD DICKINSON

Attesting Officer

Director of Patents and Trademarks